United States Patent Office 2,891,293
Patented June 23, 1959

2,891,293
METHOD OF INITIATING AN EXOTHERMIC REACTION IN A MOLD BY CHEMICAL MEANS

Richard P. Forsythe, Kenmare, Krugersdorp, Union of South Africa, assignor to Foundry Services Limited, Birmingham, England, a British company No Drawing. Application January 18, 1957
Serial No. 634,814

Claims priority, application Union of South Africa
January 20, 1956

6 Claims. (Cl. 22—193)

This invention relates to the production of moulded compositions. It is of particular value in the production of shaped bodies of exothermic compositions such as are used in the production of castings and ingots from molten metals, and will be more particularly described in relation to that use.

According to the present invention a method of forming substantially rigid moulded bodies comprises shaping a composition which contains water and ingredients which, in the presence of water, react together exothermically at room temperatures, and treating the shaped composition with a substance which initiates the said exothermic reaction, whereby the heat generated in the said reaction dries out the shaped composition and causes it to become substantially rigid. Thus the composition is dried out without the application of external heat.

It is well known in the production of castings and ingots from molten metal to locate at strategic positions in the mould or in the feeder head thereto, compositions containing ingredients which, at the temperature of the molten metal, react together exothermically generating a great amount of heat and thus preventing premature cooling of the metal in their vicinity. This method and materials suitable therefor are described in British Patent No. 627,678. Such compositions contain essentially aluminium, an amount of oxidising agent well below the amount needed to react completely with the aluminium to oxidise it completely, and 1–5% by weight of a fluoride, e.g. sodium or potassium fluoride or sodium aluminium fluoride or potassium aluminium fluoride, to facilitate the burning of the aluminium and lower the temperature at which the reaction starts. Analogous compositions containing less fluoride, e.g. 0.2 to 1%, or more fluoride, e.g. 5–10%, are also suitable, and compositions of altogether different types have also been described for the purpose.

The aforesaid compositions usually contain aluminium or, less frequently, magnesium. They also usually contain an alkali metal nitrate such as sodium nitrate. Such compositions are made up with water, and in the ordinary practice it has been necessary to shape the composition and then dry it by a heat treatment, e.g. at 150–200° C. Since this operation consumes both time and heat it is economically desirable to eliminate it.

The present invention provides a method whereby this can be done since it is found that a suitable initiator for the drying of such compositions is a small amount of a relatively strong alkali. In the case of compositions of the character just described, which contain finely divided aluminium and an alkali nitrate, the reaction, on addition of sodium hydroxide, is believed to include the following states:

$$Al + NaOH + H_2O \rightarrow NaAlO_2 + 3H + heat$$
$$NaNO_3 + 8H \rightarrow NaOH + NH_3 + 2H_2O$$

Thus the hydrogen generated in the first reaction regenerates sodium hydroxide in the second. Accordingly a chain reaction is set up and in practice it is merely necessary to "inoculate" the shaped mass by applying a small amount of sodium hydroxide solution to one or a few points on its surface, whereupon the chain reaction indicated will take place through the whole body of the shaped mass, the heat generated serving to dry it out.

According to a preferred form of the invention, therefore, a method for the production of moulded compositions comprises shaping a composition containing water, aluminium, preferably in finely divided form, and an alkali nitrate, and applying to the surface of the shaped mass a small amount of a strong alkali, preferably caustic alkali solution.

A particularly valuable form of the invention lies in the moulding of compositions which contain essentially finely divided aluminium, an amount of oxidising agent, including alkali nitrate, well below the amount needed to react completely with the aluminium to oxidise it completely, and 0.2 to 10% of a fluoride. Such compositions preferably also contain a proportion of iron oxides and inert fillers, usually refractory materials.

The initiator is preferably a relatively strongly alkaline substance such as alkali hydroxide or carbonate, but other alkali salts such as alkali aluminates may also be employed. It is preferably employed in the form of a 1–10% by weight solution and such solution may contain, if desired, up to 10 parts by weight of alkali nitrate and/or up to 10 parts by weight of alkali fluoride. The solution will usually be in water, but solutions in ethyl alcohol are also effective. Whilst larger proportions than those stated above may be employed, they generally do not afford any additional advantage. Preferably the composition should contain 3–15% of water.

The following examples will serve to illustrate the invention but are not to be regarded as limiting it in any way:

Example 1

A moulding mass of the following composition was prepared:

| | Lbs. |
|---|---|
| Fireclay grog (—8 plus 14 mesh) | 38 |
| Feathery millscale (from wire draw bench) | 22 |
| Aluminium shavings (—16 mesh) | 18 |
| Granulated aluminium foil | 8 |
| Aluminium powder (paint grade, i.e. —200 mesh) | 7 |
| Sodium nitrate | 7 |
| Fluorspar (powdered) | 5 |
| Bentonite | 4 |
| Dextrin | 4 |

The material was milled with the addition of 10% of water and allowed to mature for 8 to 12 hours before use. Two standard core specimens were prepared from the milled composition.

A treatment solution was prepared as follows:

| | Grams |
|---|---|
| Sodium hydroxide | 10 |
| Sodium nitrate | 10 |
| Water | 200 |

Ten drops of this solution were applied to the top of one of the cores. Within two minutes steam rose from the inoculated area. The drying process then spread throughout the core. Action ceased after a further 8 minutes and the core was dry.

To the top of the second core the solution prepared above was applied after dilution with an equal volume of water. Within 10 minutes the drying process became visible in the form of steam from the zone of inoculation. After a further period of 10 minutes the core was dry.

Example 2

A moulding mass of the following composition was prepared:

| | Pounds |
|---|---|
| Fire-clay grog | 53 |
| Aluminium blown powder, —100 mesh | 26 |
| Sodium nitrate | 11 |
| Aluminium blown powder, —60 mesh | 6 |
| Granulated aluminium foil, —20 mesh | 5 |
| Iron millscale | 5 |
| Cryolite powdered | 4 |
| Ball clay | 3 |
| Fluorspar powdered | 1 |

This material was milled and treated with the solution as specified in the first example and a dry core was produced in a short period of time.

It should be noted that after drying the cores of the examples still contained aluminium and oxidising agents such as $Fe_3O_4$ (millscale) and that if the cores are put to subsequent use in casting metals an incandescent exothermic reaction takes place in the well-known manner.

I claim:

1. A method for the production of a rigid moulded composition which contains ingredients capable of exothermically reacting together at high temperatures which comprises shaping a composition which contains finely divided aluminium, an oxidising agent including alkali nitrate, the total amount of oxidising agent being well below the amount necessary to react completely with the aluminium to oxidise it completely, 0.2 to 10% by weight of a fluoride, and water, and applying to the shaped composition a small amount of a strongly alkaline solution.

2. A method for the production of a rigid moulded composition which contains ingredients capable of exothermically reacting together at high temperatures which comprises shaping a composition which contains finely divided aluminium, an oxidising agent including alkali nitrate and iron oxide the total amount of oxidising agent being well below the amount necessary to react completely with the aluminium to oxidise it completely, 0.2 to 10% by weight of a fluoride, and water, and applying to the shaped composition a small amount of a strongly alkaline solution.

3. A method for the production of a rigid moulded composition which contains ingredients capable of exothermically reacting together at high temperatures which comprises shaping a composition which contains finely divided aluminium, an oxidising agent including alkali nitrate, the total amount of oxidising agent being well below the amount necessary to react completely with the aluminium to oxidise it completely, 0.2 to 10% by weight of a fluoride, and 3–15% by weight of water, and applying to the shaped composition a small amount of a strongly alkaline solution.

4. A method for the production of a rigid moulded composition which contains ingredients capable of exothermically reacting together at high temperatures which comprises shaping a composition which contains finely divided aluminium, an oxidising agent including alkali nitrate, the total amount of oxidising agent being well below the amount necessary to react completely with the aluminium to oxidise it completely, 0.2 to 10% by weight of a fluoride, and water, and applying to the shaped composition a small amount of a solution of an alkali selected from the class consisting of alkali hydroxide, carbonate and aluminate.

5. A method for the production of a rigid moulded composition which contains ingredients capable of exothermically reacting together at high temperatures which comprises shaping a composition which contains finely divided aluminium, an oxidising agent including alkali nitrate, the total amount of oxidising agent being well below the amount necessary to react completely with the aluminium to oxidise it completely, 0.2 to 10% by weight of a fluoride, and water, and applying at a small number of points only on the surface of the shaped composition a small amount of a strongly alkaline solution.

6. A method for the production of a rigid moulded composition which contains ingredients capable of exothermically reacting together at high temperatures which comprises shaping a composition which contains finely divided aluminium, an oxidising agent including alkali nitrate and iron oxide, the total amount of oxidising agent being well below the amount necessary to react completely with the aluminium to oxidise it completely, 0.2 to 10% by weight of a fluoride and 3 to 15% by weight of water and applying to a small number of points only on the surface of the shaped composition a small amount of a solution of an alkaline substance selected from the class consisting of alkali hydroxide, carbonate and aluminate.

References Cited in the file of this patent

UNITED STATES PATENTS

| 2,591,105 | Strauss et al. | Apr. 1, 1952 |
| 2,631,344 | Kennedy | Mar. 17, 1953 |